Sept. 26, 1967 A. G. KALLAY 3,343,759

TAPE CARTRIDGE AND WINDING MECHANISM

Filed June 21, 1965

4 Sheets-Sheet 1

INVENTOR
ADAM G. KALLAY

BY
Marzall, Johnston, Cook & Root
ATTORNEYS

INVENTOR
ADAM G. KALLAY

BY
Mozzell, Johnston, Cook & Root
ATTORNEYS

TAPE CARTRIDGE AND WINDING MECHANISM

Filed June 21, 1965 4 Sheets-Sheet 3

INVENTOR
ADAM G. KALLAY
BY
Marzall, Johnston, Cook & Root
ATTORNEYS

TAPE CARTRIDGE AND WINDING MECHANISM

Filed June 21, 1965

4 Sheets-Sheet 4

INVENTOR
ADAM G. KALLAY

BY
Mazzall, Johnston, Cook & Root
ATTORNEYS

United States Patent Office 3,343,759
Patented Sept. 26, 1967

3,343,759

TAPE CARTRIDGE AND WINDING MECHANISM

Adam G. Kallay, 3330 N. Lakeshore Drive,
Chicago, Ill. 60657

Filed June 21, 1965, Ser. No. 465,368
17 Claims. (Cl. 242—55.19)

ABSTRACT OF THE DISCLOSURE

Tape cartridge for endless programmed tape including a pair of tape storage spools one of which has upper and lower superposed tape contact surfaces.

This invention relates in general to a tape cartridge for use in tape recording and/or playback machines, and more particularly to a tape cartridge capable of storing an endless tape of any desired length and which may be utilized with a tape recording and/or playback machine continuously to effect repeated playback of the material programmed on the tape. The invention also relates to a tape holder and tensioning device serving as an internal component of said tape cartridge and, in addition, serving as an external component for winding and storing tapes before placement in the cartridge. The invention further relates to a tape cartridge and a winding mechanism for winding a length of tape that may be inserted into the tape cartridge, although other uses and purposes will be apparent to one skilled in the art.

While the present invention will be described herein for use primarily with magnetic recording tape, it should be appreciated that the invention may also be applicable for use with motion picture film or any other endless web, band or ribbon-like material that may be used to store information which can be reproduced or read-out by suitable mechanism. These tapes or films are usually constructed of such base materials as acetate, polyester or polyvinyl chloride and are readily available from commercial sources. Thus, the term "tape" as used herein includes, but is not limited to, magnetic recording tape and motion picture film.

Tape cartridges heretofore developed for endless tapes have generally required the use of a relatively thick lubricated tape, such as one impregnated with graphite or a similar lubricant. The known cartridges are constructed in such a manner that, without such lubrication of the tape, serious frictional problems arise which cause rapid wear and even breakage of the tape. On the other hand, use of a lubricant tends to cause malfunctioning of the playing and/or recording heads because of the lubricant that becomes transferred from the tape to the other components engaged by the tape during the operation of the cartridge. Graphite or similar lubricants are especially troublesome because they are so easily transferred to other electronic or mechanical components located in the vicinity of the cartridge, and considerable maintenance time is required to clean all of these components in order to keep them reasonably free of lubricant. Moreover the cost of a lubricated tape is substantially greater than the standard non-lubricated tape. Furthermore, known tape cartridges have required the use of pressure pads to obtain the necessary tension on the tape during its operation so that it properly engages the recording or playback heads of a tape machine. Also tape cartridges heretofore available have required a braking mechanism that is used to brake the spool within the cartridge when the cartridge is not being used on a machine. Moreover, prior tape cartridges have had difficulty in the problem of override that causes some slack in the tape run at the playback head and thereby produces undesirable wow or flutter in sound reproduction.

It is therefore an object of the present invention to provide a new and improved tape cartridge that will obviate the above difficulties.

Another object of this invention is the provision of a tape cartridge for an endless tape that permits repeating of the programmed material, and which can be easily and economically manufactured.

Still another object of this invention resides in the provision of a tape cartridge for an endless tape that is so constructed as to enable the use of inexpensive non-lubricated tapes, including tapes of lower strength, weight and/or thickness.

A further object of this invention is to provide a tape cartridge for an endless tape that is constructed to operate without the use of braking springs or clutches and/or the usual pressure pads for tensioning the tape.

A still further object of this invention is the provision of a tape cartridge for an endless tape having means for maintaining the proper tension on the tape at all times and which operates without producing wow or flutter in sound reproduction.

Another object of this invention resides in the provision of a tape cartridge for endless tape that is capable of handling nearly any length of tape efficiently and properly.

Another feature of the present invention is to provide a winding mechanism in combination with the tape cartridge of the invention for winding tapes to a desired length and under proper tension.

Still another object of the invention is to provide a winding mechanism and a tensioning device or tape holder for winding tape to a precise desired length and to a predetermined tension so that it may be immediately inserted in the tape cartridge of the invention.

Other objects, features and advantages of the invention will be apparent from the following detailed disclosure, taken in conjunction with the accompanying sheets of drawings, wherein like reference numerals refer to like parts and in which.

Figure 20:
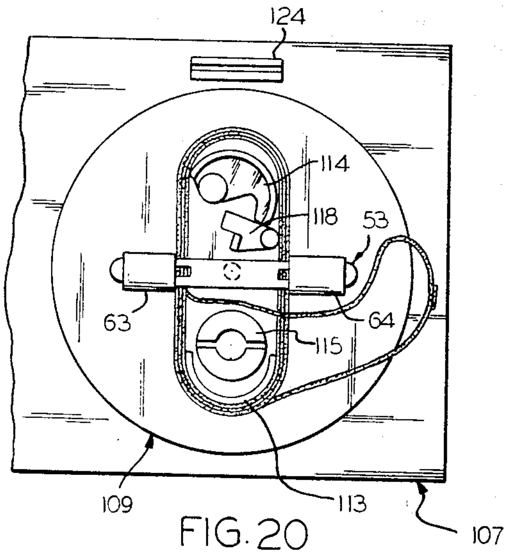
Figure 21:
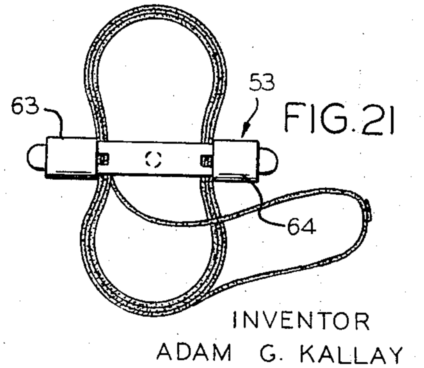

FIG. 20 is a diagrammatic top plan view of the tape winding machine and illustrating the manner in which the tape is released so that it may be removed from the tape winding machine with the tape holder and tensioning device; and FIG. 21 is a diagrammatic top plan view of the tape holder and tensioning device and a length of tape as removed from the tape winding machine and placed in readiness to be placed in a tape cartridge according to the present invention.

Referring now to the drawings and particularly to FIGS. 1–4, the tape cartridge of the present invention includes a casing 25 defined by a body or base member 26 and a cover member 27. The casing may be made of any suitable type of material such as the rigid and durable plastics available today. The plastic may be opaque or transparent, but preferably the cover member 27 should be transparent to view the operation of the internal components during usage. While the casing is shown to be generally rectangular in shape, it should be appreciated that it could be of any other desired shape to serve in any suitable arrangement providing that it is capable of holding the internal components necessary for operation. Further, the tape cartridge is intended to be used for housing and handling an endless tape or strip of material having programmed information thereon. For example, the endless tape can be a magnetic tape, thereby enabling the cartridge to be used with a tape recording and/or playback machine, and where used with a tape playback machine, the cartridge would permit repeated translation of the information material on the tape into sound through the playback machine. Another example of usage would be where the endless tape constitutes a motion picture film having a photographic image thereon which can be transmitted onto a screen from a projector. It should also be appreciated that the endless tape might be of such a type as to utilize other types of programmed material and then be employed in connection with a readout machine for translating the programmed material to a usable medium, for example in computers and automated machinery or processes. The tape cartridge herein illustrated is one that is for use with a tape recording and/or playback machine and is shown diagrammatically for such use in FIG. 9. Thus, the invention will be hereinafter described as applied to tape recording and playback machines as one particular embodiment of the invention, it being understood that various adaptations can be readily made for other uses.

Figures 1, 2, 3, 4, 5, 6, 7:
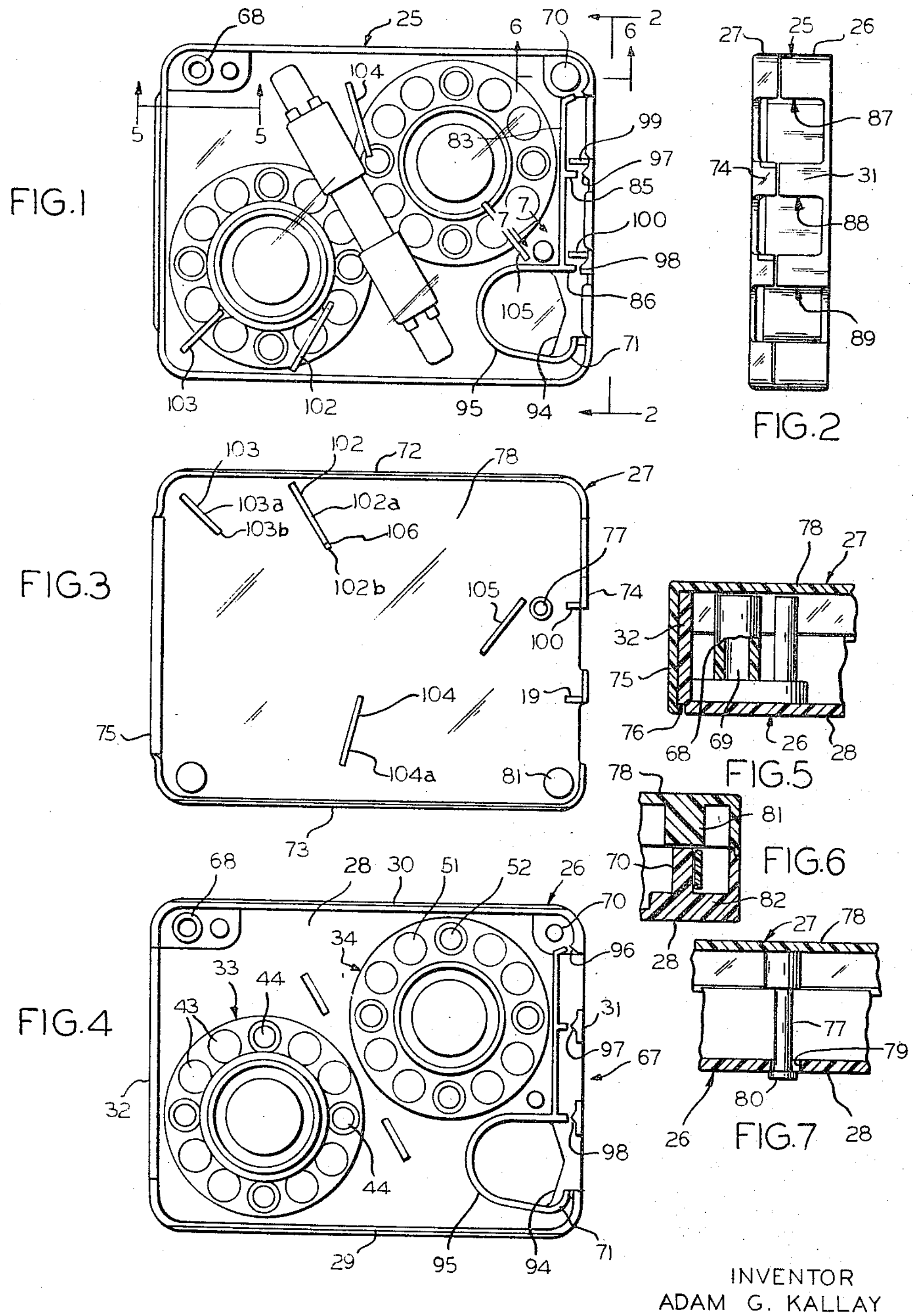
FIG. 1 is a top plan view of the tape cartridge according to the present invention.
FIG. 2 is an end elevational view of the tape cartridge of FIG. 1 and taken substantially along line 2—2 thereof.
FIG. 3 is a bottom plan view of the cover for the tape cartridge of FIG. 1.
FIG. 4 is a top plan view of the tape cartridge with the cover removed.
FIG. 5 is an enlarged fragmentary sectional view taken substantially along line 5—5 of FIG. 1.
FIG. 6 is an enlarged fragmentary sectional view taken substantialy along line 6—6 of FIG. 1.
FIG. 7 is an enlarged fragmentary sectional view taken substantially along line 7—7 of FIG. 1.
Figure 8:
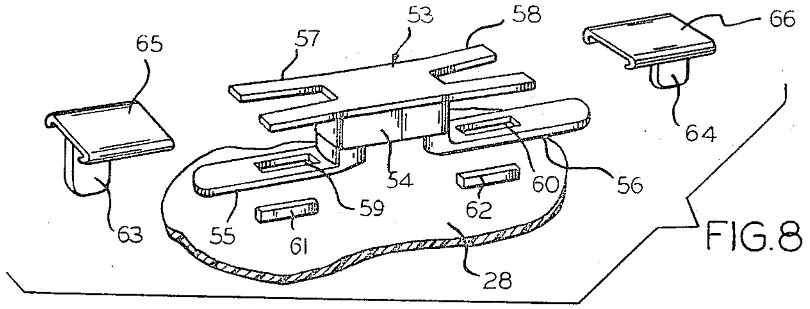
FIG. 8 is an exploded perspective view of the tape holder and tensioning device according to the present invention.

The base member 26 includes a bottom panel 28, opposed parallel upstanding panels 29 and 30, and opposed upstanding front and back panels 31 and 32, FIG. 4.

Rotatably mounted within the casing and on the bottom panel 28 of the base member 26 are first and second spools or reels 33 and 34, which may also be referred to as a double plane spool and a winding spool, respectively. The spools rotate about upstanding axes that are parallel to each other and that extend substantially along a diagonal line of the bottom member 26.

Figure 10:
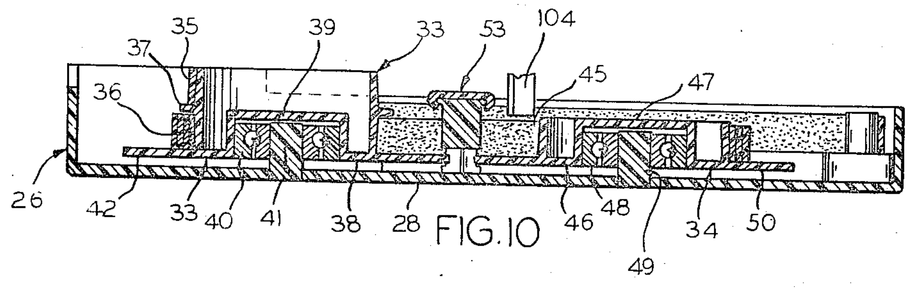
FIG. 10 is an enlarged sectional view taken along line 10—10 of FIG. 9.

Referring to FIG. 10, the double plane spool 33 includes upper and lower planes having upper and lower tape contact surfaces 35 and 36 separated by an annular radially extending guiding flange 37. The upper tape contact surface is slightly tapered inwardly from its lower edge to its upper edge, while the lower tape contact surface is slightly tapered inwardly from its upper edge to its lower edge. A web 38 is integral with the lower edge of the lower tape contacting surface 36 and has a centrally recessed portion 39 for receiving in press fit relationship a bearing member 40 carried on a stub shaft 41 that is suitably mounted on the bottom panel 28 of the base member 26. For example, a suitable opening may be provided in the bottom panel 28 for receiving in press fit relation the lower end of the stub shaft 41 to thereby rotatably mount the double plane spool 33 within the casing. A radially extending annular flange 42 extends from the web 38 as a continuation thereof for supporting the lower edges of any tape wound about the tape engaging surface 36. In order to reduce frictional contact between the tape and the flange 42, a plurality of recesses 43 and openings 44 are provided therealong. Thus, the annular flange 42 supports tape to be wound around the lower tape contacting surface 36 while the guiding flange 37 supports tape to be wound about the upper contacting surface 35.

The winding spool 34 includes a single plane having a single tape contacting surface 45 that is slightly flared or tapered inwardly from the upper edge to the lower edge in the same manner as the tape contacting surface 36 is tapered. A web or hub portion 46 includes a recess portion 47 for receiving a bearing member 48 in press fit relation. The bearing member 48 is carried on a stub shaft 49 that is suitably secured to the bottom panel 28 of the base member 26. A radially extending annular tape supporting flange 50 extends from the web member 46 and serves to support tape held on the winding spool 34. The flange 50 also includes a plurality of recessed areas 51 and openings 52 to reduce frictional contact between the tape and the flange.

Arranged between the spools 33 and 34 is a tape holder and tensioning device 53 that includes a central upstanding body 54, FIGS. 8, 9, 10 and 12, having a pair of oppositely extending legs 55 and 56 at the lower end, and a pair of oppositely extending bifurcated arms 57 and 58 at the upper end. The legs 55 and 56 are respectively provided with rectangularly shaped openings 59 and 60 that receive therein posts 61 and 62 mounted on the bottom panel 28 of the base member 26. The openings 59 and 60 and the posts 61 and 62 are dimensioned so that they mate tightly to hold the tape holder and tensioning device 53 in position between the spools 33 and 34. The longitudinal axis of the tape holder and tensioning device 53 when the device is mounted within the casing extends substantially perpendicular to a line going through the rotational axes of the spools 33 and 34. Tensioning guides 63 and 64, respectively, extending from mounting plates 65 and 66, are frictionally and adjustably held on the arms 57 and 58 to provide the desired tension of the tape runs extending between the spools 33 and 34. The tensioning guides also function to retain the tape in place on the holder body when it is transferred from the tape winding machine or a storage area to the cartridge. The tape holder and tensioning device also serves to aid in the winding of tape used in the cartridge and insertion of the tape in place on the spools. The function in this regard of the tape holder will be more clearly described hereinafter. Moreover, the tape holder may be used to store programmed tape so that programming in a cartridge may be changed by removing one tape holder and replacing same with another.

Figure 9:
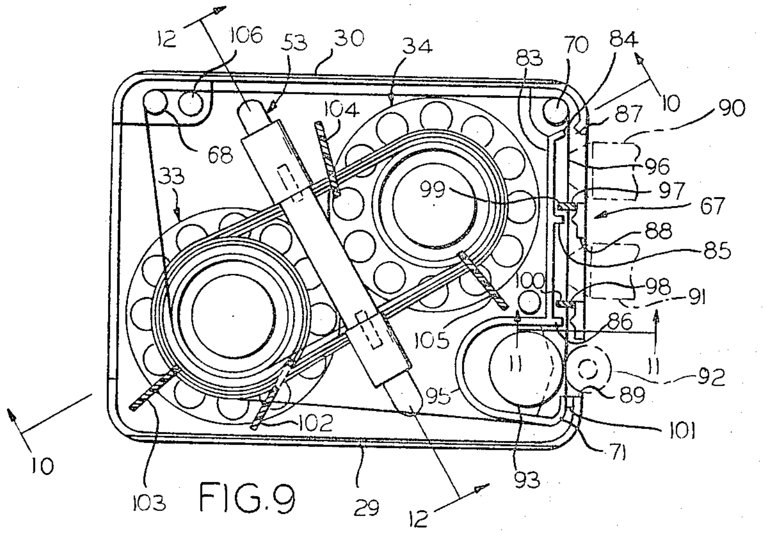
FIG. 9 is a top plan view of the tape cartridge according to the invention and illustrating a length of tape, exaggerated in size for clarity, mounted therein and the relative association of the tape cartridge with a tape recording and playback machine.

The tape may be of any desired length commensurate with the dimensional size of the tape cartridge, and in the embodiment of FIGS. 9 and 10 will run through the readout station 67, around the lower plane of the double plane spool 33, around the single plane of the winding spool 34, again around the lower plane of the double plane spool 33 inside of the first run and again around the single plane of the spool 34 inside of the first run until a sufficient amount is stored on these spools, and then upwardly from the inner side of the runs stored on the winding spool and around the upper plane of the double plane spool 33, and back to the read-out station 67. The tensioning guides 63 and 64 on the tension holder and tensioning device 53 effect the proper tension on the tape runs extending between the spools 33 and 34 as well as guiding the tape runs.

When the tape leaves the upper plane of the spool 33, it is trained about a rotatable guide 68, that is rotatably mounted on a post 69, FIG. 5, and then about a guide post 70 and into the read-out station 67. The rotatable guide 68 permits friction-free movement of the tape thereabout and the stringing of the tape to the one corner of the casing so that it can run down along the upstanding panel 30. While the rotatable guide 68 is shown as such, it should be appreciated that it could constitute a fixed post similar to the post 70 for guiding purposes, or that the post 70 may encompass a rotatable guide member. After leaving the read-out station 67, the tape is trained over an arcuate guide member 71 and back onto the lower plane of the double plane spool 33.

The cover member 27 includes opposed panels 72 and 73 that mate with the opposed panels 29 and 30 of the body member 26, and front and back panels 74 and 75 that mate with front and back panels 31 and 32 of the base member. The back panel 75 is provided with a lip 76 at its lower end that hooks over the lower edge of the back panel 32 of the base member 26 and lays along the back panel 32 as shown in FIG. 5. The back end of the cover member being hooked on permits a locking pin 77 secured to the top panel 78 of the cover member to engage in an opening 79 as seen in FIG. 7. A radial flange 80 is provided on the lower end of the pin 77 for engaging over the bottom panel 28 as shown to lock the cover in position on the base member. The pin 77 is normally resiliently biased to a locking position as shown in FIG. 7 and by merely urging the pin so that the flange 80 will align with the hole 79. The pin can be removed from the hole to allow removal of the cover member 27 from the base member 26 and full access of the interior of the casing.

When the cover member 27 is in mounted position, the upper panel 78 coacts with the rotatable guide 68, FIG. 5, to prevent the tape from being displaced from the rotatable guide. In order to properly orient the tape in the read-out station, an enlarged button 81 extends downwardly from the upper panel 78 of the cover member to coact with the fixed guide post 70 and orient the movement of the tape thereover. The button 81 is substantially larger than the post 70 so that it provides a guiding surface for the upper edge of the tape, while a raised portion 82 is provided along the bottom panel 28 of the base member to define a guide for the lower edge of the tape. Thus, when the tape moves about the fixed guide post 70, it is confined to move in a predetermined path a certain elevation within the casing.

In order to properly guide the movement of the tape through the read-out station 67, an upstanding wall 83 is provided which extends parallel to the front panels of the casing and cover member and along the read-out station, which includes horizontally spaced upstanding tape guide bars 84, 85 and 86. The tape guide bars 84 and 85 are arranged along opposite sides of an opening 87 formed in the front panels 31 and 74 of the base member and cover member, respectively, while the tape guide bar 86 along with the tape guide bar 85 are arranged along opposite sides of a second opening 88 formed in the front panels, FIG. 2. A third opening 89 is formed in the front panels between the arcuate guides 71 and the tape guide bar 86. In operation with a recording and/or playback machine, the opening 87 will accommodate a recording head 90, while the opening 88 will accommodate a playback head 91. A pressure idler roller 92 may be accommodated in the opening 89 and coact with a tape driving roller 93 that may be extended through an opening 94 in the bottom panel 28 of the base member 26. Thus the tape driving roller 93 coacts with the idler roller 92 to grasp and drive the tape adjacent the read-out station. An antidust wall 95 extends upwardly from the bottom panel 28 to the upper panel of the cover member to aid in preventing the entrace of dust through the opening 94 and into the interior of the casing.

Figure 11:
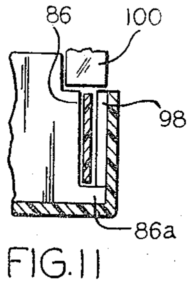
FIG. 11 is an enlarged detail sectional view taken along line 11—11 of FIG. 9.

Coacting with the tape guide bars 84, 85 and 86 are tape guide projections 96, 97 and 98 that extend inwardly from the front panel 31 of the base member 26, FIGS. 4 and 9, for the purpose of holding the tape running through the read-out station in a properly oriented position so that the recording and/or play-back heads can properly act thereon. The lower edge of the tape is guided by guide bars extending from the tape guide bars 84, 85 and 86 as illustrated by the bar 86a that extends from the tape guiding bar 86, FIG. 11, while the upper edge of the tape running through the read-out station is guided by downwardly extending guide plates 99 and 100 that are secured to the upper panel 78 of the cover member 27. Thus, it can be seen that precise control and guiding action is imposed on the tape running through the read-out station 67.

In the tape driving station, a guide member 101 also coacts with the arcuate member 71 in preventing undue movement of the tape after it has passed the driving station. It should be appreciated that actuation of the tape driving roller 93 and placement of the cartridge in position relative to a tape driving roller may be accompished by any known manner.

When the tape leaves the arcuate guide 71, a guide member 102 coacts with the tape supporting flange 42 of the double plane spool 33 to guide the tape onto the lower plane of this spool. The guide member 102 is mounted on and extends downwardly from the upper panel 78 of the cover member 27. The end of the guide member 102 closest to the spool 33 also serves to define an upstanding edge that guides movement of the tape between the winding spool 34 and the upper plane of the spool 33. Thus the guide member 102 has an edge 102a guiding the tape onto the lower plane of the double plane spool 33, and a guiding edge 102b that aids in guiding the tape onto the upper plane of the spool 33.

To further assure the maintaining of the tape on the lower plane of the spool 33, a further guide member 103 is arranged adjacent one corner of the casing as seen in FIG. 9 and positioned so that the lower edge 103a is substantially coplanar with the radial flange 37, while the upstanding edge 103b is arranged immediately adjacent the flange 37. The guide member 103 also extends downwardly from the top panel 78 of the cover member.

A tape guide member 104 is arranged to coact with the tape supporting flange 50 of the spool 34 in maintaining the tape initially being wound on the spool 34 at the proper level of operation. The guide member 104 has its lower edge 104a that guides the upper edge of the tape. This guide member is mounted on the upper panel 78 of the cover member.

A further guide member 105 coacts with the flange 50 of the spool 34 in maintaining the tape at the proper level as it leaves the spool 34 to be trained about the lower plane of the spool 33. Thus, a supply of tape is maintained on the lower plane of the spool 33 and the winding spool 34. A guide pin 106 extends downwardly from the end of the guide member 102 adjacent the edge 102b to separate the tape runs coming from the winding spool 34 and going to the upper and lower planes of the spool 33. The tape runs coming from the winding spool for movement around the lower plane of the spool 33 must be maintained in alignment to train over the lower plane and the guide pin 106 functions to keep these runs under the guide edge 102*a* of the guide 102, while the edge 102*b* guides the run coming from the winding spool to the upper plane of spool 33. The tape run trained about the upper plane of the spool 33 is taken from the inside of the supply of tape trained about the spools 33 and 34 and from the inside of the spool 34. This tape run is then elevated to the upper plane of the spool 33 and then extended to the guide roller 68. As seen particularly in FIG. 12, the tension guide pins 63 and 64 are arranged to properly tension and remove any unnecessary slack between the tape running between the spools 33 and 34. The mounting plates 65 and 66 are seen to have their outer edges curled over and coact with the arms 57 and 58 in tight frictional relationship so that they are frictionally held in any position as set when applying the proper tension.

Figure 12:
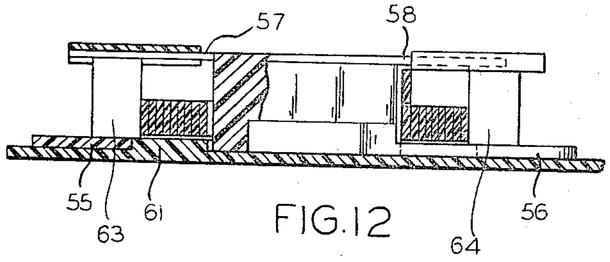
FIG. 12 is an enlarged detail sectional and elevational view taken substantially along line 12—12 of FIG. 9.

The illustrated embodiment with the tape shown in FIGS. 9, 10 and 12 demonstrates the manner in which the tape will be strung when it is necessary to store some of the tape within the casing on the spools. Any amount of tape may be stored on the spools consistent with the supporting flanges, and it should be appreciated that if greater amounts of tape are desired to be arranged in endless form, the entire cartridge may be increased in size so that larger spools with larger supporting flanges may be used.

Figures 13, 14, 15:
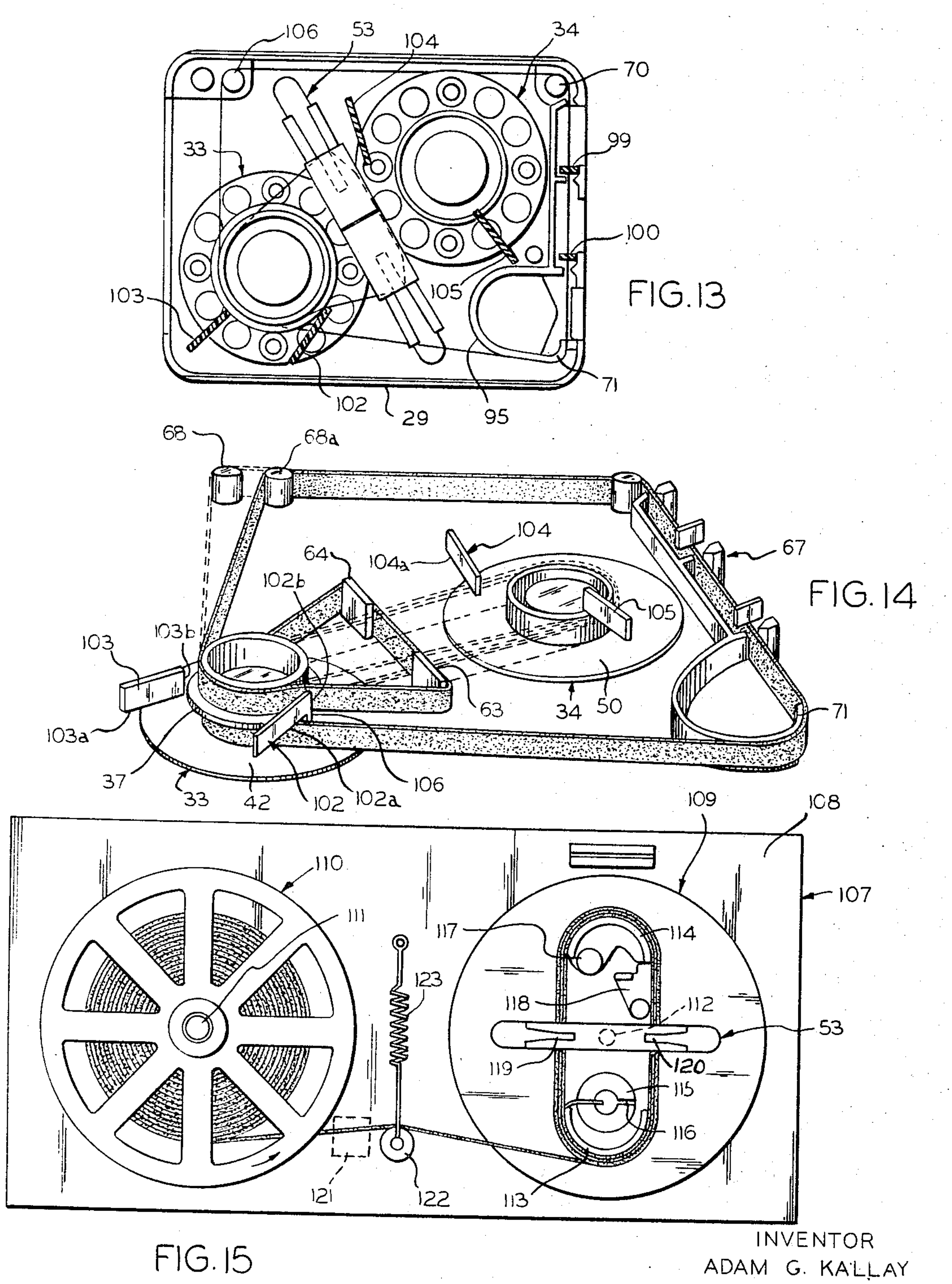
FIG. 13 is a top plan view of a tape cartridge showing another stringing arrangement of the tape within the cartridge for obtaining the use of short lengths of tape.
FIG. 14 is a perspective diagrammatic view illustrating the tape stringing arrangements of the embodiments of FIGS. 9 and 13.
FIG. 15 is a top plan view of a tape winding machine for winding tape for use in the tape cartridge of the present invention.
Figure 16:
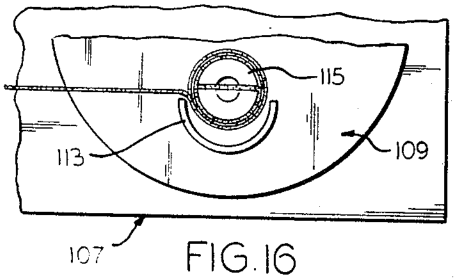
FIG. 16 is a detail top plan view illustrating the manner in which the tape is initially secured to the tape winding machine.

There is a specific need for an extremely short length of tape for repeat usage, especially in the broadcast industry where it is desired to have what is known as a "3 second" tape. While the tape cartridge of the present invention may operate at any known tape speeds, the most common tape speed is 7½" per second speed. Thus for a "3 second" tape, where the speed is 7½" per second, the length of the tape needed would only be 22½". With the preferred tape cartridge of the invention, it is not possible to string a length of tape as short as 22½" about both of the spools 33 and 34, but it is possible to string such a length of tape within the cartridge of the present invention and have it operate properly. Such an illustrated tape arrangement is shown in FIGS. 13 and 14, wherein the tape as it is taken from the arcuate guide 71 is first trained over the lower plane of the spool 33. It is then trained about the guide pins or tensioning pins 63 and 64 of the tape holder and tensioning device 53, and then back up over the upper plane of the double plane spool 33. Again, inasmuch as the tape is shorter, a fixed guide post 68*a* is arranged adjacent to the guide roller 68 for receiving the tape and guiding it along the side of the casing and up to the read-out station 67.

Referring now to FIGS. 15–21, a machine for winding tape for use in the tape cartridge of the present invention and the steps taken in the winding procedure are illustrated. The machine, generally indicated by the numeral 107, FIG. 15, includes a deck 108 having a rotatably mounted and driven turntable 109 thereon in spaced relation from a reel of tape 110 that is rotatably mounted on an idler shaft 111. The turntable 109 is carried on a driven shaft 112 that drives the turntable in a counterclockwise direction.

The turntable 109 includes a fixed arcuate tape support 113 and a movable arcuate tape support 114. Between the fixed and movable supports is a rotatable tape anchoring post 115 having a diametrically extending slot 116 into which the tape is initially placed. Then the tape is wound about the post 115 by rotating the post in a clockwise direction until three or four layers of tape are on the post.

Figure 17:
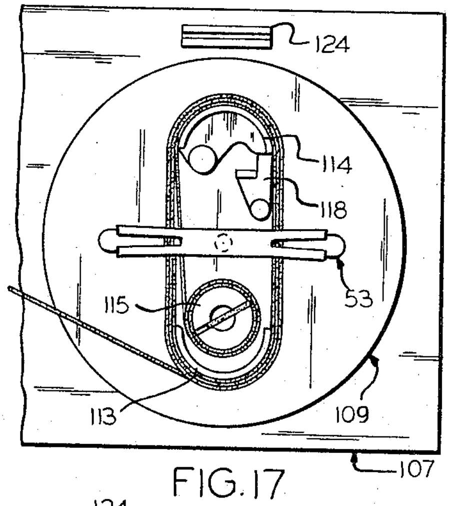
FIG. 17 illustrates the winding operation with the tape holder in position on the winding machine.
Figure 18:
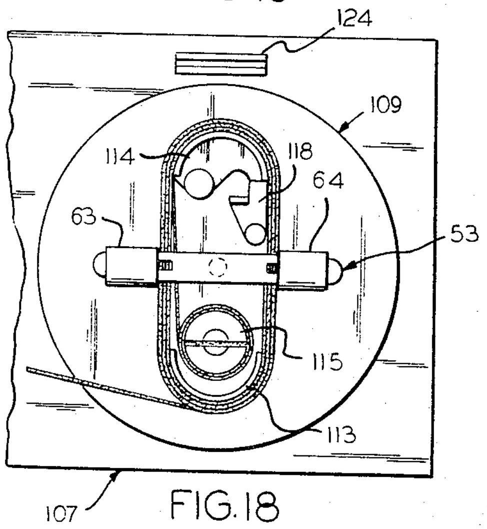
FIG. 18 is a top plan view of the winding machine illustrating the manner of mounting the tensioning guides on the tape holder after the necessary amount of tape has been wound.
Figure 19:
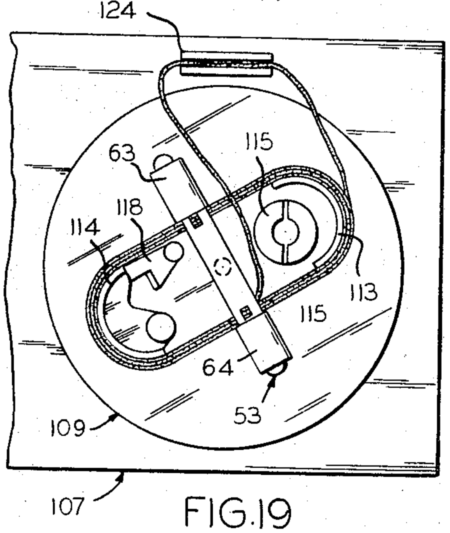
FIG. 19 is a diagrammatic top plan view of the tape winding machine and illustrating the manner in which the ends of the tape are spliced together.

The movable tape support 114 pivots on a pin 117 and is locked in position as shown in FIGS. 15, 17, 18 and 19 by a pivotal locking member 118. The tape holder and tensioning device 53 is then mounted on the turntable 109 by placing it on posts 119 and 120. The tensioning pins 63 and 64 are removed from the tape holder 53 during the winding of the tape. Upon winding of the tape slightly on the turntable 109, the supply is measured and taken from the reel 110 by a combination feed driver and counter 121, after which the tape runs over a tensioning roller 122 that is tensioned a predetermined amount against the tape by means of a spring 123. When the predetermined amount of tape has been wound on the turntable 109, the turntable is stopped and the tensioning pins 63 and 64 are mounted on the arms of the tape holder 53 to hold the tape portions extending between the tape supports in proper position. Then the tape is cut and the end is spliced with the end carried on the post 115. Note the splicing operation as shown in FIG. 17 wherein the ends are spliced by a splicer 124. After the tape ends have been properly spliced to define an endless tape, the locking member 118 is swung counterclockwise to permit clockwise movement of the movable support 114 as shown in FIG. 20. Thus, the tape is loosened from the tape supports and may be lifted off by grasping the tape holder and tensioning device 53 as shown in FIGS. 20 and 21. The tape in the tape holder may then be inserted in a tape cartridge and properly threaded as heretofore described, or stored for future use in a tape cartridge.

It will be understood that modifications and variations may be effected without departing from the scope of the novel concepts of the present invention, and that this invention is to be limited only by the scope of the appended claims.

The invention is hereby claimed as follows:

1. A tape cartridge for an endless tape having programed material thereon, said cartridge comprising a casing, a material read-out station in the casing, a first spool rotatably mounted in the casing having upper and lower superposed tape contact surfaces, the upper tape contact surface tapering slightly toward the upper edge thereof and the lower tape contact surface tapering slightly toward the lower edge thereof, a second spool rotatably mounted within said casing and having a tape contact surface substantially coplanar with said lower tape contact surface of said first spool, means for tensioning the tape by acting on the tape runs extending between said spools, and means for guiding the tape about said spools and through said material read-out station.

2. A tape cartridge for an endless tape having programed material thereon, said cartridge comprising a casing, a material read-out station in the casing, a first spool rotatably mounted in the casing having upper and lower superposed tape contact surfaces, the upper tape contact surface tapering slightly toward the upper edge thereof and the lower tape contact surface tapering slightly toward the lower edge thereof, a second spool rotatably mounted within said casing and having a tape contact surface substantially coplanar with said lower tape contact surface of said first spool, the tape contact surface of said second spool tapering slightly toward the lower edge thereof, means for tensioning the tape by acting on the tape runs extending between said spools, and means for guiding the tape about said spools and through said material read-out station.

3. A tape cartridge for an endless tape having programed material thereon, said cartridge comprising a casing, a material read-out station in the casing, a first spool rotatably mounted in the casing having upper and lower superposed tape contact surfaces, a second spool rotatably mounted within said casing and having a tape contact surface substantially coplanar with said lower tape contact surface of said first spool, means for tensioning the tape runs extending between the lower tape contact surface of said first spool and the tape contact surface of said second spool, and means for guiding the tape sequentially through the material read-out station around the lower tape contact surface of the first spool around the tape contact surface of said second spool again around said just mentioned surfaces a plurality of times around the upper tape contact surface of said first spool and back to the material read-out station.

4. A tape cartridge for an endless tape having programed material thereon, said cartridge comprising a casing having a base member and a cover member, a material read-out station in the casing, a double plane spool rotatably mounted in the casing having upper and lower planes for training tape thereover, a winding spool rotatably mounted in the casing having a single plane arranged on the same level as said lower plane, means for guiding the tape sequentially through the read-out station around the lower and single planes of said spools upward from said single plane and around said upper plane and back to the read-out station, and means arranged to exert a tension on the tape running between the lower plane and the single plane of said spools.

5. A tape cartridge for an endless tape having programed material thereon, said cartridge comprising a casing having a base member and a cover member, a material read-out station in the casing, a double plane spool rotatably mounted in the casing having upper and lower planes for training tape thereover, a winding spool rotatably mounted in the casing having a single plane arranged on the same level as said lower plane, means for guiding the tape sequentially through the read-out station around the lower and single planes of said spools upward from said single plane and around said upper plane and back to the read-out station, and means arranged to exert a tension on the tape running between the lower plane and the single plane of said spools, said tension means including pins engaging the outermost layers of said tape runs.

6. The combination as defined in claim 5, wherein said tension means is adjustable.

7. A tape cartridge for an endless tape having programed material thereon, said cartridge comprising a casing having a base member and a cover member, a material read-out station in the casing, a double plane spool rotatably mounted in the casing having upper and lower planes for training tape thereover, a winding spool rotatably mounted in the casing having a single plane arranged on the same level as said lower plane, means for guiding the tape sequentially through the read-out station around the lower and single planes of said spools upward from said single plane and around said upper plane and back to the read-out station, means arranged to exert a tension on the tape running between the lower plane and the single plane of said spools, and tape guide means on said cover member coacting with said spools to maintain the proper stringing of the tape runs on said planes.

8. A tape cartridge for an endless tape having programed material thereon, said cartridge comprising a casing having a base member and a cover member, a material read-out station in the casing, a double plane spool rotatably mounted in the casing having upper and lower planes for training tape thereover, a winding spool rotatably mounted in the casing having a single plane arranged on the same level as said lower plane, means for guiding the tape sequentially through the read-out station around the lower and single planes of said spools upward from said single plane and around said upper plane and back to the read-out station, means arranged to exert a tension on the tape running between the lower plane and the single plane of said spools, and coacting tape guide means on said base and cover members in said read-out station to closely guide movement of said tape therethrough.

9. A tape cartridge for a short length of endless tape having programed material thereon, said cartridge comprising a casing having a base member and a cover member, a material read-out station in the casing, a double plane spool rotatably mounted in the casing having upper and lower planes for training tape thereover, first and second adjustable tensioning tape guides adjacent said spool, and means for guiding the tape sequentially through the read-out station around the lower plane of said spool around said first adjustable tape guide around said second adjustable tape guide around the upper plane of said spool and back to the read-out station.

10. A device for preparing a predetermined length of endless tape for use in a tape cartridge comprising a rotatably driven turntable, first and second tape supporting members to permit tape to be wound therearound, one of said members being stationary and the other being movable to facilitate removal of the tape from the turntable, means on the table for mounting a tape holder thereon so that the tape may be removed from the turntable, means for measuring the tape wound on said supporting members, means for tensioning the tape as it is wound, and means for splicing the tape ends.

11. A device for preparing a predetermined length of endless tape for use in a tape cartridge comprising a rotatably driven turntable, first and second tape supporting members to permit tape to be wound therearound, one of said members being stationary and the other being movable to facilitate removal of the tape from the turntable, means on the table for mounting a tape holder thereon so that the tape may be removed from the turntable, means for measuring the tape wound on said supporting members, means for tensioning the tape as it is wound, means for splicing the tape ends, and means adjacent the turntable for driving the tape to the turntable.

12. A tape holder for an endless length of tape to be employed in a tape cartridge, comprising an upstanding body having a pair of oppositely extending legs on the lower end and a pair of oppositely extending arms at the upper end, and a pair of tape retaining members each including a channel section adjustably and frictionally received on an arm and a bar extending therefrom between an arm and leg to hold tape runs at one side of the body.

13. A tape holder for an endless length of tape for use in a tape cartridge comprising an upstanding body having a pair of oppositely extending legs on the lower end and a pair of oppositely extending bifurcated arms on the upper end, the axes of said arms paralleling the axes of said legs; and a pair of tape retaining members each including a channel section adjustably and frictionally received on an arm and a bar extending therefrom between an arm and leg to hold tape runs at one side of the body.

14. A tape cartridge for an endless tape having programed material thereon, said cartridge comprising a casing, a material read-out station in the casing, a first spool rotatably mounted in the casing having upper and lower superposed tape contact surfaces, the upper tape contact surface tapering slightly toward the upper edge thereof and the lower tape contact surface tapering slightly toward the lower edge thereof, a second spool rotatably mounted within said casing and having a tape contact surface substantially coplanar with said lower tape-contact surface of said first spool, the tape contact surface of said second spool tapering slightly toward the lower edge thereof, and means for guiding the tape about said spools and through said material read-out station.

15. A tape cartridge for an endless tape having programed material thereon, said cartridge comprising a casing, a material read-out station in the casing, a first spool rotatably mounted in the casing having upper and lower superposed tape contact surfaces, a second spool rotatably mounted within said casing and having a tape contact surface substantially coplanar with said lower tape contact surface of said first spool, and means for guiding the tape sequentially through the material read-out station around the lower tape contact surface of the first spool around the tape contact surface of said second spool again around said just mentioned surfaces a plurality of times around the upper tape contact surface of said first spool and back to the material read-out station.

16. A tape cartridge for an endless tape having programed material thereon, said cartridge comprising a casing having a base member and a cover member, a material read-out station in the casing, a double plane spool rotatably mounted in the casing having upper and lower planes for training tape thereover, a winding spool rotatably mounted in the casing having a single plane arranged on the same level as said lower plane, and means for guiding the tape sequentially through the read-out station around the lower and single planes of said spools upward from said single plane and around said upper plane and back to the read-out station.

17. A tape cartridge for an endless tape having programed material thereon, said cartridge comprising a casing, a material read-out station in the casing, a first spool rotatably mounted in the casing having upper and lower superposed tape contact surfaces, a second spool rotatably mounted within said casing and having a tape contact surface substantially coplanar with said lower tape contact surface of said first spool, a tape supporting flange on each of said spools for supporting the lower tape runs, and means for guiding the tape sequentially through the material read-out station around the lower tape contact surface of the first spool around the tape contact surface of said second spool again around said just mentioned surfaces a plurality of times around the upper tape contact surface of said first spool and back to the material read-out station.

References Cited

UNITED STATES PATENTS

| | | | |
|---|---|---|---|
| 2,810,574 | 10/1957 | Daniel | 242—55.19 |
| 2,975,988 | 3/1961 | Galluzzi | 242—55.19 |

LEONARD D. CHRISTIAN, *Primary Examiner.*